March 25, 1941.   M. B. CAMERON   2,236,259
BRAKE MECHANISM
Filed Oct. 31, 1939
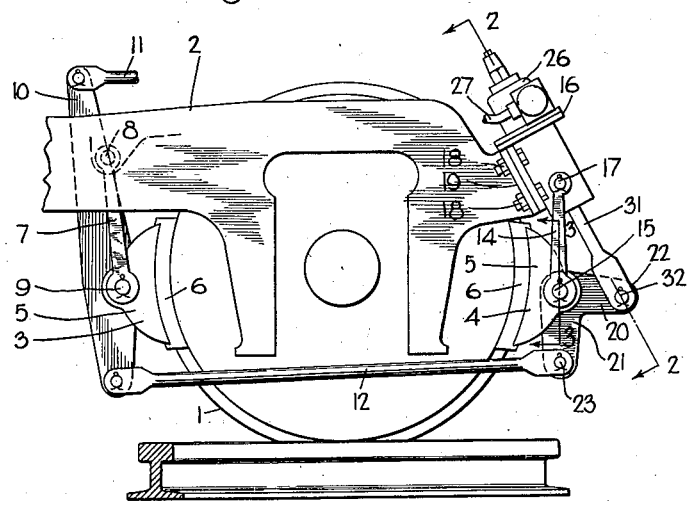
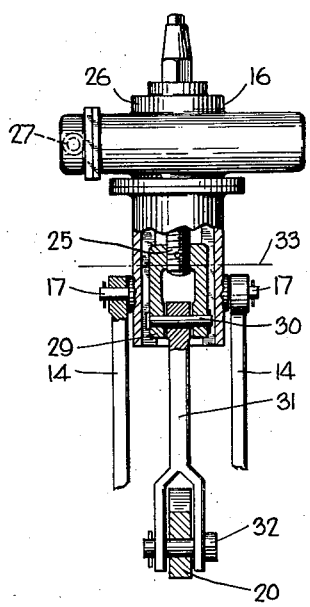
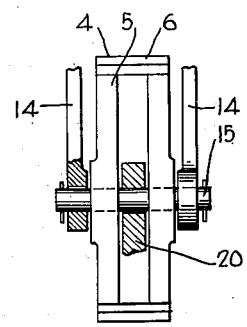
INVENTOR
MORTIMER B. CAMERON
BY
ATTORNEY Patented Mar. 25, 1941

2,236,259

UNITED STATES PATENT OFFICE 2,236,259

BRAKE MECHANISM

Mortimer B. Cameron, Edgewood, Pa., assignor to The Westinghouse Air Brake Company, Wilmerding, Pa., a corporation of Pennsylvania Application October 31, 1939, Serial No. 302,151

19 Claims. (Cl. 188—198)

This invention relates to brake rigging for railway vehicles and more particularly to the type which embodies automatically operative means for taking-up slack in the rigging due to wear of brake shoes and associated parts of the rigging.

Automatically operative slack adjuster devices, such as are commonly employed in brake rigging, are usually arranged to provide a fulcrum for one of the levers in the rigging and to automatically adjust said fulcrum, as required, to compensate for wear of the various parts of the rigging, including the brake shoes. As is well known, such adjustment changes the angularity of the levers in the rigging, with the maximum change in angularity occurring in the lever connected directly to the slack adjuster device since the changes in the angularity of all other levers in the rigging are additive in the direction thereof.

In certain modern vehicles it is customary to mount all of the brake rigging including the brake cylinder and automatic slack adjuster device on the truck. The space for the mounting and operation of brake rigging on these trucks is however very limited and in certain instances the angularity of the lever connected to the slack adjuster device has to be held within a very small range which usually is insufficient to compensate for complete wearing away of the brake shoes. To offset this limitation manually operative slack adjusting means are included in the rigging to be operated when the brake shoes are partly worn away to compensate for such wear and to permit the automatic slack adjuster device to be reset to automatically take-up slack during another period of wear of the shoes. The range of movement and the change of angularity of the lever connected to the slack adjuster device is thereby maintained within the limited space provided on the truck and, as will be evident, the take-up movement of the slack adjuster device is held to a relatively small degree. It is however undesirable to have to make slack take-up adjustments manually during the life of the brake shoes.

One object of the present invention is therefore to provide a brake rigging including improved automatically operative slack take-up arrangements adapted to obviate the limitation just described.

Another object of the invention is to provide a brake rigging including automatically operative slack adjuster means adapted, with a less take-up movement than has heretofore been possible to use, to take-up the slack in a brake rigging due full wear of the brake shoe or shoes in the rigging.

Still another object of the invention is to provide a brake rigging including automatically operative slack take-up means adapted to compensate for full wear of the shoe or shoes in the rigging and in which the problem of lever angularity is eliminated insofar as space on the truck is concerned.

Other objects and advantages will be apparent from the following more detailed description of the invention.

In the accompanying drawing, Fig. 1 is a side elevational view of a portion of a railway vehicle truck adjacent one end thereof showing the improved brake rigging applied thereto; and Figs. 2 and 3 are sectional views taken respectively on the lines 2—2 and 3—3 in Fig. 1 with certain elements in Fig. 2 shown in a different position than occupied in Fig. 1.

As shown in the drawing, the reference numerals 1 and 2 indicate, respectively, a wheel and a portion of a side frame of a railway vehicle truck of any conventional type employed in connection with railway vehicles. A more complete showing and description of the vehicle truck is not deemed essential to a clear understanding of the present invention.

For the purpose of illustrating one application of the invention, it is preferably associated with a brake rigging of the type including a pair of friction brake elements 3 and 4 arranged in clasp relation at opposite sides of the wheel 1. Each of the elements 3 and 4 may be of usual construction comprising a brake head 5 and a friction brake shoe 6 carried by said head and arranged to frictionally engage the tread of wheel 1.

The brake element 3 is supported from the frame 2 for movement toward and away from the tread of wheel 1 by a hanger 7 which is pivotally connected at its upper end to the frame 2 by a pin 8 and which is pivotally connected at its lower end to the brake head 5 of said element by a pin 9.

A live brake lever 10 is pivotally connected intermediate its ends to the pin 9. The upper end of this lever is pivotally connected to one end of a pull rod 11 through which force from a brake cylinder device (not shown) of the brake rigging is adapted to be applied to said lever for moving the brake elements 3 and 4 into frictional braking engagement with wheel 1 as will be more fully described hereinafter. The lower end of lever 10 is pivotally connected to one end of a substantially horizontally extending bottom or tie rod 12.

The friction brake element 4 is supported from the frame 2 in braking relation with wheel 1 by a hanger comprising two spaced rods 14 having their lower ends disposed at opposite sides of the brake element 4 and connected thereto by a pin 15. The opposite ends of the hanger rods 14 are disposed at opposite sides of the casing of an automatic slack adjuster device 16 and are pivotally mounted on lugs 17 projecting from said device for carrying same and thereby the brake element 4. The automatic slack adjuster device 16 is mounted on and rigidly secured by bolts 18 to a bracket 19 formed on the end of truck frame 2.

A bell crank 20 is provided having its knee disposed between the two hanger rods 14 and pivotally mounted on pin 15. The bell crank is provided with a substantially vertically disposed arm 21 depending from the pin 15 and a substantially horizontally extending arm 22. The lower end of the arm 21 is pivotally connected by a pin 23 to the bottom rod 12 thereby providing an operating connection between the bell-crank 20 and the live brake lever 10.

The slack adjuster device 16 is preferably of the type having a take-up screw 25 adapted to be moved into the device for taking up slack in the brake rigging.

The screw 25 may be thus operated by a fluid pressure controlled engine 26 adapted to be controlled by fluid under pressure supplied to a pipe 27. The pipe 27 may be connected to the usual brake cylinder device (not shown) which is adapted to control the operation of the brake rigging. The connection between pipe 27 and the brake cylinder device may be arranged in the usual manner so that fluid under pressure will be supplied to said pipe in effecting an application of the brakes when the stroke of the piston in the brake cylinder device exceeds a certain chosen degree and will be released from said pipe upon release of the brake cylinder device.

Whenever fluid under pressure is supplied to the slack take-up engine 26, said engine is adapted to condition means (not shown) within the device for operating, upon the release of fluid under pressure from pipe 27, to draw screw 25 into the device a certain increment. The construction and operation of slack adjusters of this type and their control from brake cylinder devices are so well known that a further description thereof is not deemed essential to an understanding of the present invention.

A cross-head 29 is connected to the outer end of the take-up screw 25 for movement therewith, and pivotally connected at one end to said cross-head by means of a pin 30 is one end of an adjusting link 31. The other end of the adjusting link 31 is pivotally connected by a pin 32 to the end of the bell crank arm 22.

The bracket 19 on the truck frame 2 is arranged to support the slack adjuster device in such a position that the longitudinal axis of the take-up screw 25 is at an angle to the vertical and in substantial alignment with that of the link 31 when the brake shoes 6 are in a substantially semi-worn out condition and in engagement with the tread of wheel 1, as shown in Fig. 1. When the brake shoes 6 are new this arrangement provides that the axis of link 31 will be arranged at a slight angle to and at the right hand side of that of screw 25, while when said shoes are in a fully worn out condition the axis of said link will be at a slight angle to and at the left hand side of that of said screw, with the shoes 6 engaging wheel 1. By this arrangement side thrust of the cross-head 29 in the slack adjuster device is minimized when force is applied to the link 31.

In Fig. 2 of the drawing, the cross-head 29 is shown in the position which it will assume when the brake shoes 6 are new. At the time the brake shoes 6 become completely worn out or worn to the extent where replacement thereof is necessary, the pin 30 in the cross-head 29 will be moved to and occupy a position such as indicated by a dot and dash line 33 in Fig. 2. The travel of the slack adjuster to take-up slack in the brake rigging due to full wearing away of the brake shoes 6 will thus be equal to the distance between the pin 30 and line 33 in Fig. 2 of the drawing, and mid-way between said pin and line the oppositely disposed lugs 17 are provided for supporting the brake shoe hanger rods 14. By this arrangement the pin 30 connecting the upper end of the adjusting link 31 to the cross-head 29 will be in coaxial relation with lugs 17 when the brake shoes are in a substantially semi-worn out condition. When the brake shoes 6 are either new or fully worn out the pin 30 will be positioned either slightly above or below the lugs 17. The condition in which the axes of pin 30 and lugs 17 are coincident is preferred under all conditions of shoe wear but the slight variation in the position of pin 30 either side of the lugs 17 will, for all practical purposes, provide substantially the same result, as will be hereinafter more fully brought out.

It will now be evident that the hanger rods 14 support the knee of the bell crank 20 and the brake element 4 from the truck frame in braking relation with the tread of wheel 1. The link 31 is adapted to hold bell crank 20 against turning relative to the hanger means 14 when an application of brakes is effected. The bell crank 20, hanger rods 14 and link 31 thus constitute the dead lever means of the brake rigging having at its upper end a pivotal connection with the truck frame through the slack adjuster device 16 and pivotally connected at its lower end to bottom rod 12 for operation thereby.

*Operation*

If it is desired to move the friction brake elements 3 and 4 into frictional braking engagement with wheel 1 for retarding rotation thereof, the usual brake cylinder device (not shown) is operated by fluid under pressure to actuate the pull rod 11 for thereby moving the upper end of the live brake lever 10 in the direction of the right hand. This operation of the live lever 10 moves the brake element 3 into engagement with the tread of wheel 1 and at the same time acts through the bottom rod 12 to turn the dead lever means, comprising the bell crank 20, hanger rods 14 and adjusting link 31, in a clockwise direction about the fulcrum connection with the slack adjuster device 16 for thereby moving the friction brake element 4 into engagement with the tread of wheel 1. After the friction brake elements 3 and 4 are thus both moved into engagement with the wheel 1 further pressure applied by the brake cylinder device to the live lever 10 acts to urge said brake elements against the wheel with force to effect braking thereof.

In order to effect a release of the brakes after an application, fluid under pressure is vented from the usual brake cylinder device, thereby relieving the pressure on the live lever 10 and through the bottom rod 12 on the dead lever means permitting the friction brake elements 3 and 4 to be disengaged from the wheel 1, in the usual manner.

It will be noted that in effecting an application of the brakes, as just described, the hanger rods 14 and adjusting link 31 cooperate with the arm 22 of the bell crank 20 to rigidly hold said bell crank against being turned by force applied thereto through the bottom rod 12. In other words, the hanger means 14, link 31 and bell crank 20 constitute, in effect, a substantially rigid dead lever for operating the brake element 4.

If in effecting an application of the brakes the travel of the usual brake cylinder piston exceeds a certain chosen degree, then fluid under pressure is supplied from said device to the slack adjuster device 16 by way of pipe 27. Upon the subsequent release operation of the brake cylinder device this fluid under pressure is released from the slack adjuster device 16.

This supply of fluid under pressure to the slack adjuster device is adapted to condition same for operation upon the subsequent release of fluid under pressure therefrom to effect movement of the screw 25 into the device a certain fixed increment. This movement of the screw 25 acts through the adjusting link 31 to turn the bell crank 20 in a counterclockwise direction about the fulcrum pin 15 so as to thereby position the lower end of the bell crank arm 21 a slightly greater distance away from the tread of the wheel 1. This operation of the bell crank 20 is transmitted through the bottom rod 12 to the lower end of the live lever 10 and is reflected in a shortening of the distance between the fulcrum pins 9 and 15 carrying the friction brake elements 3 and 4. This action compensates for wear of the brake elements 3 and 4 as will be apparent, so that the stroke of the brake cylinder piston required to move the brake elements 3 and 4 into engagement with wheel 1 will be shorter upon the next succeeding application of brakes as compared to the preceding application of brakes.

When the friction brake elements 3 and 4 again become worn sufficiently to require an excessive stroke of the usual brake cylinder piston in applying the brakes the slack adjuster device 16 is again operated, as just described, to turn the bell crank 20 further in a counterclockwise direction for thereby again urging the brake elements toward each other a sufficient amount to compensate for the wear thereof. The automatic slack adjuster device 16 will thus continue to operate throughout the life of the friction brake elements 3 and 4 to rock the bell crank 20 in steps sufficient to offset certain increments of wear of said elements so as to thereby maintain the travel of the brake cylinder piston required to effect an application of the brakes substantially constant throughout the life of said elements.

It will be noted that with the brake elements 3 and 4 in engagement with the wheel 1 subsequent to a slack take-up operation of the automatic slack adjuster device 16, the pin 15 will be slightly closer to the wheel than before said operation and the connection between the arm 21 of the bell crank and the bottom rod 12 will be slightly further away from the wheel. This positioning of the pin 15 closer to the wheel would tend to draw the lower end of the adjusting link 31 closer to the wheel also, but this tendency is offset to a certain extent by the change in angular position of the bell crank arm 22. The movement of the adjusting link 31 out of alignment with the adjusting screw 25 is thus reduced to a minimum and as a consequence side thrust of the crosshead 29 in the adjuster is also held to a minimum.

With the brake element 4 in a semi-worn out condition and engaging wheel 1, the fulcrum pin 30 in the crosshead 29 will be in coaxial relation with lugs 17 and the pin 23 at the lower end of the bell crank arm 21 will be substantially vertically below the pin 15. With this relationship, force applied through the bottom rod 12 to arm 21 of the bell crank lever 20 will act through a moment arm equal substantially to the distance between the pin 23 and lugs 17 to apply force to the brake element 4 through a moment arm equal substantially to the distance between the lugs 17 and pin 15. In other words, the bell crank 20, hanger rods 14 and adjuster link 31 will act, under the condition just described, to provide substantially the same multiplication of force for operation of the brake element 4, as would be obtained with a rigid one-piece dead lever of usual type.

In all other positions which the pin 30 in crosshead 29 may assume with respect to lugs 17 and which the bell crank 20 may assume while the brake shoes 6 are being worn out slightly different multiplications of force between the bottom rod 12 and brake element 4 will be obtained than under the semi-worn out condition of said element, above described. For all practical purposes, however, these slight variations in the multiplication of force for actuating the brake element 4 are immaterial.

In this improved brake rigging it will be noted that slack in the rigging is taken up merely by shifting of the fulcrum pin 15 and of the pin 23 in the connection between the bell crank 20 and bottom rod 12 relative to each other and to the lugs 17, which provides a fixed fulcrum connection between the dead lever means and the truck frame through the medium of the slack adjuster device 16. Only sufficient space is therefore required on the truck frame 2 to provide for this fixed fulcrum since all changes of angularity of the dead lever means for taking up slack occurs within said dead lever means and is therefore independent of the truck frame.

The length of the bell crank arm 22 may of course be any desired degree but in this improved rigging where the principal function of said arm is to take-up slack it may be made relatively short and the slack adjuster device may therefore be provided with less take-up movement than heretofore required in conventional brake rigging. This is of course of primary importance since it permits the use of slack adjuster devices which are smaller than it has heretofore been possible to use.

*Summary*

It will now be readily seen that space limitations on modern trucks will not present as great a problem for the installaiton of the improved brake rigging as presented in connection with the conventional type, since in the improved rigging the taking up of slack is not dependent upon any special provision of space on the truck but rather occurs entirely within the lever means and substantially independent of the truck frame. Only space for the fixed fulcrum of the dead lever means need be provided on the truck frame. The improved rigging also provides for a relatively great degree of slack take-up with a relatively small travel of the slack take-up means, as a consequence of which slack adjuster devices of smaller size and which have a shorter take-up stroke may be used as compared to the requirements in conventional arrangements.

While one illustrative embodiment of the invention has been described in detail, it is not the intention to limit the scope to that embodiment or otherwise than by the terms of the appended claims.

Having now described my invention, what I claim as new and desire to secure by Letters Patent is:

1. A lever means for a brake rigging comprising a pair of rigid power transmitting members constituting lever arms of said lever means, means providing a rockable connection between said members, slack adjuster means connected to one of said members at a point spaced from said rockable connection, and means responsive to a change in slack in said brake rigging for operating said slack adjuster means to rock one of said members relative to the other to compensate for such change in slack.

2. A lever means for a brake rigging comprising a pair of rigid power transmitting members constituting lever arms of said lever means, means providing a rockable connection between said members, slack adjuster means connected to one of said members at a point spaced from said rockable connection, and responsive to a change in slack in said brake rigging to rock the one of said members relative to the other to compensate for such change in slack, and means providing a connection between said slack adjuster means and the other of said members for rendering both of said members operable in unison.

3. A lever means for a brake rigging comprising a pair of rigid power transmitting members constituting lever arms of said lever means, means providing a rockable connection between said members, slack adjuster means, means connecting said slack adjuster means to said members at points spaced from said rockable connection, and means responsive to a change in slack in said rigging for operating said slack adjuster means to move one of said members relative to the other to compensate for the change in slack.

4. A lever means for a brake rigging comprising a pair of rigid power transmitting members constituting lever arms of said lever means, a pin providing a rockable connection between said members, slack adjuster means connected to one of said members at a point spaced from said connection, and means responsive to a change of slack in said brake rigging for operating said slack adjuster means to rock one of said members relative to the other to compensate for such change in slack.

5. A lever means for a brake rigging comprising a pair of rigid power transmitting members constituting lever arms of said lever means, a pin carried by one of said members and providing a fulcrum for the other of said members, and means including slack adjusting means connecting said members at points spaced from said pin and responsive to a change in slack in said brake rigging for rocking one of said members relative to the other to compensate for said change in slack.

6. A lever means for a brake rigging comprising a lever member, a fulcrum member connected to one end of said lever member providing a fulcrum therefore, a fulcrum pin in the other end of said lever member, another lever member rockably mounted on said pin, slack adjuster means connected to said other lever member and operable to rock same relative to the first named lever member to compensate for slack in said brake rigging, and means responsive to changes in slack in said brake rigging for controlling the operation of said slack adjuster means.

7. A lever means for a brake rigging comprising a lever member, a fulcrum member connected to one end of said lever member providing a fulcrum therefore, a fulcrum pin in the other end of said lever member, another lever member rockably mounted on said pin, slack adjuster means connected to said other lever member and operable to rock same relative to the first named lever member to compensate for slack in said brake rigging, means responsive to changes in slack in said brake rigging for controlling the operation of said slack adjuster means, and means providing a fulcrum for said slack adjusting means for rendering the second named lever member rockable with the first named lever member upon rocking thereof on said fulcrum member.

8. A lever means for a brake rigging comprising a lever member, a fulcrum member connected to one end of said lever member providing a fulcrum therefore, a fulcrum pin in the other end of said lever member, another lever member rockably mounted on said pin, slack adjuster means connected to said other lever member and operable to rock same relative to the first named lever member to compensate for slack in said brake rigging, means responsive to changes in slack in said brake rigging for controlling the operation of said slack adjuster means, and means providing a fulcrum for said slack adjuster means in substantial coaxial relation with said fulcrum member for rendering the second named lever member rockable with the first named lever member upon rocking thereof on said fulcrum member.

9. A lever means for a brake rigging comprising a lever member, a fulcrum member connected to one end of said lever member providing a fulcrum therefore, a fulcrum pin in the other end of said lever member, another lever member rockably mounted on said pin, slack adjuster means connected to said other lever member and operable to rock same relative to the first named lever member to compensate for slack in said brake rigging, means responsive to changes in slack in said brake rigging for controlling the operation of said slack adjuster means, and means providing a fulcrum for said slack adjusting means immediately adjacent said fulcrum member for rendering the second named lever member rockable with the first named lever member upon rocking thereof on said fulcrum member.

10. A lever means for a brake rigging comprising a lever member, a fulcrum member connected to one end of said lever member providing a fulcrum therefore, a fulcrum pin in the other end of said lever member, another lever member rockably mounted on said pin, slack adjuster means connected to said other lever member and operable to rock same relative to the first named lever member to compensate for slack in said brake rigging, means responsive to changes in slack in said brake rigging for controlling the operation of said slack adjuster means, and means providing a fulcrum for said slack adjusting means, which fulcrum is intersected by a line extending through said fulcrum member and fulcrum pin for rendering the second named lever member rockable with the first named lever member upon rocking thereof on said fulcrum member.

11. A lever means for a brake rigging comprising a lever member, a fulcrum pin at one end of said member, a bell crank having its knee fulcrumed on said pin, slack adjuster means connected to one arm of said bell crank at a point remote from said pin, and means responsive to a change in slack in said brake rigging for operating said slack adjuster means to change the relative angular positions of said lever member and the other arm of said bell crank to compensate for said change in slack.

12. A lever means for a brake rigging comprising a lever member, a fulcrum pin at one end of said member, a bell crank having its knee fulcrumed on said pin, slack adjuster means connected to one arm of said bell crank at a point remote from said pin, the other arm of said bell crank constituting a lever arm of said lever means, and means responsive to a change in slack in said brake rigging for operating said slack adjuster means to rock said bell crank relative to said lever member to change the angular relation between said lever arm and lever member to compensate for said change in slack.

13. In combination, a truck frame, a lever member having at one end a fixed fulcrum connection with said frame, a pin in the opposite end of said member, a bell crank fulcrumed at its knee on said pin and being so arranged that one arm extends away from said member in a direction generally parallel to the length of said member, slack adjuster means connected to the other arm of said bell crank, control means responsive to an increase in slack in said rigging for operating said slack adjuster means to rock said bell crank relative to said member to change the relative angular positions of said member and said one arm of said bell crank to compensate for said change in slack, and means providing a rockable connection between said slack adjuster means and control means so arranged as to provide for movement of said one arm of said bell crank with said lever member upon rocking thereof on said fixed fulcrum connection.

14. In combination, a truck frame, a slack adjuster device comprising a casing secured to said frame and a slack take-up element in said casing movable relative to said casing to take-up slack in a brake rigging, a lever member having at one end a fixed fulcrum connection with said casing, another lever member, means providing a rockable connection between said lever members which is spaced from said fulcrum connection, and connecting means connecting said slack take-up element to the last named lever member at a point spaced from said rockable connection and operable by said slack take-up element to rock said last named member relative to the other lever member to compensate for slack in said brake rigging.

15. In combination, a truck frame, a slack adjuster device comprising a casing secured to said frame and a slack take-up element in said casing movable relative to said casing to take-up slack in a brake rigging, a lever member having at one end a fixed fulcrum connection with said casing, another lever member, means providing a rockable connection between said lever members which is spaced from said fulcrum connection, connecting means connecting said slack take-up element to the last named lever member at a point spaced from said rockable connection and operable by said slack take-up element to rock said last named lever member relative to the other lever member to compensate for slack in said brake rigging, the connection between said connecting means and the slack take-up element being so arranged as to provide for movement of the two lever members in unison about said fixed fulcrum connection with said casing.

16. In combination, a truck frame, a slack adjuster device comprising a casing secured to said frame and a slack take-up element in said casing movable relative to said casing to take-up slack in a brake rigging, a lever member having at one end a fixed fulcrum connection with said casing and depending from said casing, a fulcrum pin in the lower end of said member, a bell crank fulcrumed at its knee on said pin and arranged with one arm extending away from said lever member in a generally downward direction, a link connecting the other arm of said bell crank to said slack take-up element for operation thereby to change the relative angular positions of said lever member and said one arm of said bell crank to compensate for slack in said brake rigging, and means providing a rockable connection between said link and take-up element for rendering said bell crank movable with said lever member upon rocking of said lever member on said fulcrum connection with said casing.

17. In combination, a truck frame, a slack adjuster device comprising a casing secured to said frame and a slack take-up element in said casing movable relative to said casing to take-up slack in a brake rigging, a lever member having at one end a fixed fulcrum connection with said casing and depending from said casing, a fulcrum pin in the lower end of said member, a bell crank fulcrumed at its knee on said pin and arranged with one arm extending away from said lever member in a generally downward direction, a link connecting the other arm of said bell crank to said slack take-up element for operation thereby to change the relative angular positions of said lever member and said one arm of said bell crank to compensate for slack in said brake rigging, and means providing a rockable connection between said link and take-up element for rendering said bell crank movable with said lever member upon rocking of said lever member on said fulcrum connection with said casing, said slack adjuster casing being secured to said frame in such a position that a line bisecting the connections between said link, and said bell crank and said take-up element extends substantially through the center of said take-up element and in substantially the same direction as the direction of movement of said take-up element.

18. In a brake rigging for a railway vehicle truck having a truck frame and a wheel to be braked, a friction brake element adapted to be moved into braking engagement with said wheel, a dead lever means having one end pivotally connected to said frame and supporting intermediate its ends said brake element, and means connected to the lower end of said dead lever means for operating same to move said brake element into engagement with said wheel, said dead lever means comprising, a vertically arranged link-like hanger member, a bell crank, means providing a pivotal connection between the lower end of said hanger member and the knee of said bell crank and connected to said friction brake element, said bell crank being arranged with one arm extending in a generally downward direction away from the connected end of said hanger member and substantially parallel to the length of said hanger member, the other arm of said bell crank being arranged substantially at right angles to said hanger member, means including slack adjuster means providing a connection between the opposite end of said hanger member and the last named arm of said bell crank and operative to change the angularity of said first named arm of said bell crank with respect to said hanger member to compensate for slack in said brake rigging, and means responsive to changes in slack in said brake rigging for controlling the operation of said slack adjuster means.

19. In a brake rigging for a railway vehicle truck having a truck frame and a wheel to be braked, a friction brake element adapted to be moved into frictional braking engagement with said wheel, a hanger having at its upper end a fulcrum connection with said frame and supporting at its lower end said brake element and providing for movement of said element toward said wheel, a bell crank having its knee fulcrumed at the lower end of said hanger and having one arm extending in a generally downwardly direction and the other arm extending in a generally horizontal direction, means including slack adjuster means connected to the horizontally extending arm for supporting same, means responsive to a change in slack in said brake rigging for operating said slack adjuster means to regulate the relative angular positions of said hanger and vertically extending arm to compensate for said change in slack, actuating means connected to the end of said vertically extending arm for operating said arm and hanger means to move said brake element into engagement with said wheel, and means connecting said slack adjuster means with said frame and providing a fulcrum connection therefor adjacent the fulcrum connection between said hanger and frame.

MORTIMER B. CAMERON.